United States Patent [19]

Martinez

[11] Patent Number: 4,768,823
[45] Date of Patent: Sep. 6, 1988

[54] WINDSHIELD PROTECTOR AND METHOD OF USING THE SAME

[76] Inventor: Stanley D. Martinez, 2585 S. Hoyt, Lakewood, Colo. 80027

[21] Appl. No.: 34,607

[22] Filed: Apr. 6, 1987

[51] Int. Cl.$^4$ .............................................. B60J 1/20
[52] U.S. Cl. ................................ 296/95 C; 296/97 D; 160/370.2
[58] Field of Search ................ 296/95 C, 95 R, 97 R, 296/97 D, 84 K; 160/386 SY

[56] References Cited

U.S. PATENT DOCUMENTS

| | | | |
|---|---|---|---|
| 3,184,264 | 5/1965 | Ealey et al. | 160/368 S |
| 3,266,560 | 8/1966 | Mooskian | 160/368 S |
| 3,807,791 | 4/1974 | Boyer | 296/84 K |
| 3,868,293 | 2/1975 | Selph | 296/97 D |
| 3,874,437 | 4/1975 | Black | 296/95 C |
| 4,102,103 | 5/1977 | Eichstaedt | 296/95 C |
| 4,181,350 | 1/1980 | Eichstaedt | 296/95 C |

*Primary Examiner*—Robert R. Song

[57] ABSTRACT

A readily attachable and removable windshield protector adapted to substantially cover and protect a windshield of a vehicle. The protector includes a flexible, transparent sheet conforming to the configuration of the windshield and only very slightly smaller than the windshield dimensions. The sheet includes a peripheral beading and is secured to the windshield with a windshield setting tape sandwiched between the sheet and the windshield immediately adjacent to the beading. The beading and the windshield setting tape cause the sheet to be spaced apart from the underlying windshield, thereby promoting the flexibility of the sheet and creating an insulating air space. The sheet with the beading and the windshield setting tape is placed in an overlapping relation on the vehicle's windshield, and a silicone rubber seal is placed around the sheet and in contact with the windshield, thereby sealing the windshield protector against water intrusion. The seal may be peeled away from the windshield to remove the sheet from the windshield.

27 Claims, 1 Drawing Sheet

WINDSHIELD PROTECTOR AND METHOD OF USING THE SAME

BACKGROUND OF THE INVENTION

The present invention relates to a windshield protector specially adapted to prevent pebbles, gravel, and other road debris from pitting, chipping or cracking a windshield.

A recurrent problem with driving vehicles along roadways is that pebbles, gravel, and other road debris along the road are kicked up by a vehicle and strike the windshield of a following vehicle, thereby causing pitts, chips and cracks in the following vehicle's windshield. This problem is particularly acute during winter travel, when roads are purposely sanded with small pebbles and gravel to improve traction. Aside from the aesthetic drawbacks of a marred windshield, one must eventually replace the windshield at significant expense. The windshield replacement cost is especially great when the windshield must be replaced by a foreign manufacturer's specified replacement part or when the original windshield mounting is not adapted for ready replacement of the windshield.

The present invention was developed primarily as a means to inexpensively protect the windshield against pitting, chipping and cracking due to the impact of pebbles, gravel and other debris, especially during the winter season.

SUMMARY OF THE INVENTION

A readily attachable and removable windshield protector is adapted to substantially cover and protect a windshield of a vehicle. The protector includes a flexible, transparent sheet conforming to the configuration of the windshield and only very slightly small than the windshield dimensions. The sheet includes a peripheral beading and is secured to the windshield with a windshield setting tape sandwiched between the sheet and the windshield immediately adjacent to the beading. The beading and the windshield setting tape cause the sheet to be spaced apart from the underlying windshield, thereby promoting the flexibility of the sheet and creating an insulating air space. The sheet with the beading and the windshield setting tape is placed in an overlapping relation on the vehicle's windshield, and a silicone rubber seal is placed around the sheet and in contact with the windshield, thereby sealing the windshield protector against water intrusion. The seal may be peeled away from the windshield to remove the sheet from the windshield.

BRIEF DESCRIPTION OF THE DRAWINGS

The invention will be described with reference to the accompanying drawings, wherein.

DESCRIPTION OF A PREFERRED EMBODIMENT

Figure 1:
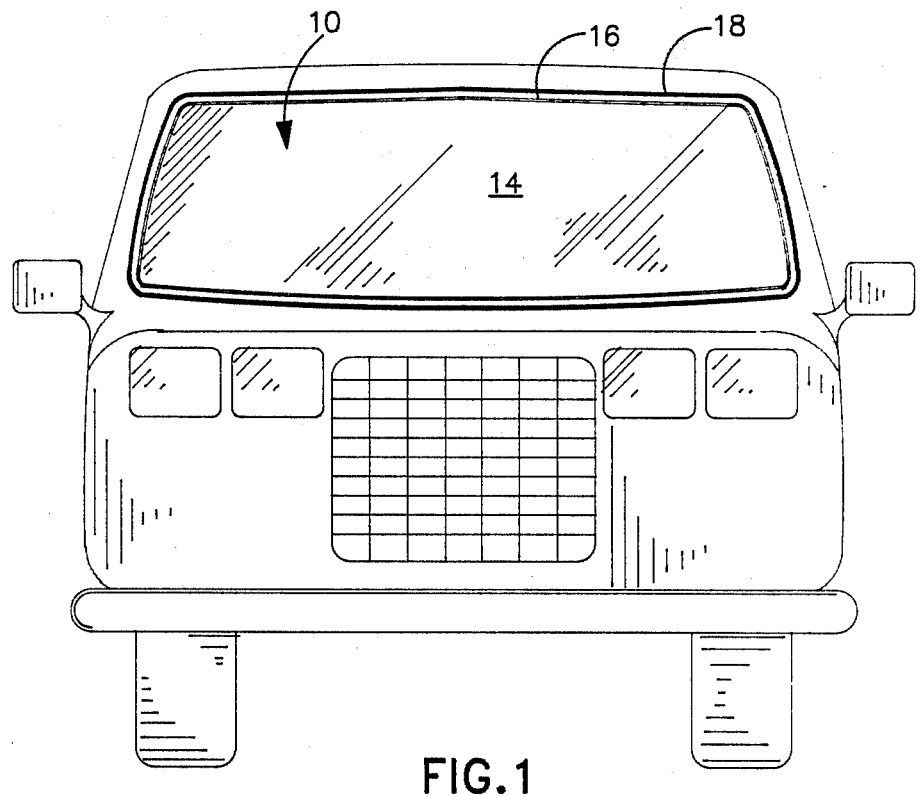
FIG. 1 is a front view of a vehicle, particularly an automobile, depicting the windshield protector mounted on the vehicle windshield.
Figure 2:
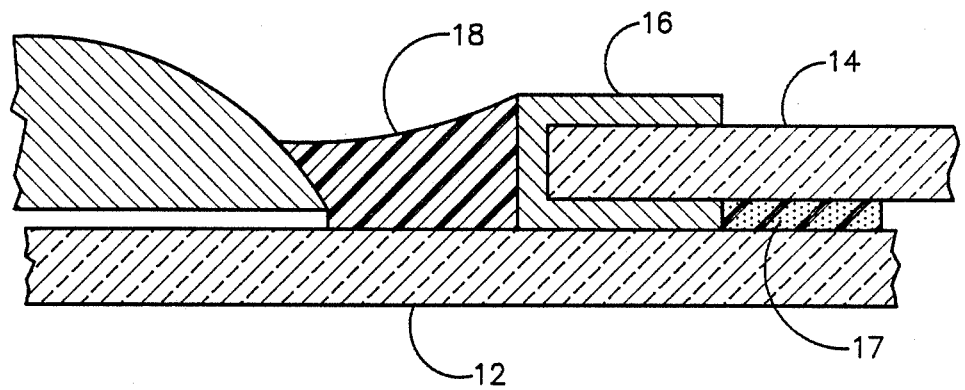
FIG. 2 is a partial cross-sectional view of the windshield protector and the vehicle windshield depicted in FIG. 1 taken in the region of the peripheral edge of the windshield protector.

Referring now to the drawings wherein like reference numerals and symbols refer to the same item, there is shown in FIG. 1 an automobile having a windshield 12 upon which is mounted a windshield protector 10 according to the preferred embodiment of the present invention.

Windshield protector 10 includes a flexible, transparent sheet 14 of material preferably in the range of one-eighth to three-eighths inch thick. The sheet may be fashioned of any one of a variety of acrylics, non-acrylics, or plexiglass. Although the sheet 14 must be substantially transparent, it should be understood that the sheet 14 may be tinted like an ordinary windshield. The dimensions of the sheet 14 are only very slightly smaller than the dimensions of the windshield 12, so that there is preferably a gap between the boundary of the windshield 12 and peripheral edge of the sheet 14 preferably in the range of between one-quarter and three-quarters inch.

A substantailly U-shaped beading 16 receives and clasps the entire peripheral edge of the sheet 14. The thickness of each arm of the U-shaped beading 16 is preferably in the range of one-sixteenth to three-sixteenths inch. Both the beading 16 and the sheet 14 are flexible so that the windshield protector 10 may be mounted in an overlapping relationship with the windshield 12 and will conform to the contours of the windshield 12. The beading 16 not only improves the aesthetic appearance of the windshield protector, but also helps insure that the sheet 14 is very slightly spaced from the underlying windshield 12 also in the range of one-sixteenth to three-sixteenths inch. Such air space helps promote the flexibility of the sheet 14 and provides an insulating layer between the sheet 14 and the windshield 12.

A dual sided adhesive windshield setting tap 17 is sandwiched between the sheet 14 and the windsheild 12 immediately adjacent to the beading 16 and along the entire length of the beading 16, thereby releaseably, yet firmly, securing the sheet 14 to the windshield 12. The windshield setting tape 17 may be a butyl tape manufactured by Trimco and possesses a thickness preferably in the range one-sixteenth to three-sixteenths inch and a width of approximately one-quarter inch. The thickness of the windshield setting tape 17 is preferably only very slightly thicker than the arm of the beading 16 so that the windshield setting tape 17 is compressively sandwiched between the sheet 14 and the windshield 12, thereby maximizing its adhesive effect. Thus the windshield setting tape 17 also helps insure that an air space is maintained between the sheet 14 and the windshield 12. The width of the windshield setting tape 17 is relatively small so as not to detract from the aesthetic appearance of the windshield protector.

When the windshield protector 10 is mounted and attached to the windshield 12, the gap between the windshield boundary and the beading 16 is filled with a silicone rubber seal 18. The silicone rubber seal 18 entriely surrounds the sheet 14 and the beading 16 and contacts the outer peripheral edge of the beading 16, the windshield 12, and a portion of the vehicle defining the windshield boundary. The seal 18 is preferably black, but may be any color. The primary function of the seal 18 is to prevent water, snow and ice from intruding into the region between the windshield protector and the windshield, although the seal 18 also helps secure the windshield protector to the windshield 12. The seal 18 is somewhat resilient and pliable and may be readily peeled from its disposition in the gap, thereby permitting the windshield protector 10 to be removed from the windshield.

It should be readily appreciated that the windshield protector of the present invention permits full visibility for the vehicle driver and does not inhibit the action of windshield wipers, defrosters, and other vehicle functions. It will further be appreciated not only that the windshield protector prevents the underlying windshield 12 from being pitted, chipped or cracked due to the impact of pebbles, gravel and other road debris, but also that the sheet 14 of the windshield protector is substantially immune to pitting, chipping and cracking due to the impact of such materials because of the flexibility of the sheet 14 and its spacing from the underlying windshield 12. Thus, when pebbles, gravel and other road debris impact upon the sheet 14, the flexibility and resiliency of the sheet 14 dampen the impact forces. The substantial immunity of the sheet 14 to pitting, chipping and cracking exists when the vehicle is driven at normal driving speeds, particularly in the range of 5 to 55 miles per hour, when the pebbles, gravel and other road debris are substances such as sandstone, granite, quartz or feldspar possessing a diameter in the range of one-fiftieth to one-quarter inch, and when such pebbles, gravel and other debris are kicked up by a preceding vehicle at rates of speed substantially in the range of plus 20 to minu 30 miles per hours. It should further be appreciated that the air space between the sheet 14 and the windshield 12 helps retain heat within the vehicle when the outside temperature is relatively cold, and helps maintain the sheet 14 relatively warm for a relatively long period of time after the vehicle interior heating means ceases to operate. This later function helps keep the sheet 14 free of ice and snow when the vehicle is stopped for short periods of time.

The windshield protector may of course be used throughout the year on a permanent basis, however, it is anticipated that the windshield protector will be most advantageously used during the relatively cold winter season. The windshield protector would be mounted on the windshield during the fall season and secured to the windshield primarily with the windshield setting tape and to a lesser degree with the silicone rubber seal. During the springtime, the silicone rubber seal would be peeled from the windshield, and the windshield protector would be removed from the windshield and stored until the following fall season. Alternatively, a new windshield protector can be mounted at any time, such as at the beginning of the next winter season.

Although particular embodiments of the present invention have been described and illustrated herein, it should be recognized that modifications and variations may readily occur to those skilled in the art and that such modifications and variations may be made without departing from the spirit and scope of my invention. Consequently, my invention as claimed below may be practiced otherwise than is specifically described above.

I claim:

1. A protector adapted to substantially cover and protect a windshield of a vehicle, said protector comprising:
    a substantially transparent sheet substantially conforming to the configuration of the windshield, said sheet being flexible and wherein the contour of said sheet substantially conforms to the contour of the windshield;
    means for selectively maintaining said sheet in an overlapping relationship with the windshield; and
    means for substantially preventing water from entering the region between said sheet and the windshield.

2. A protector according to claim 1 further comprising means for maintaining said sheet in a substantially spaced apart relationship with the windshield.

3. A protector according to claim 2 wherein said space is substantially in the range of one-sixteenth to three-sixteenths inch.

4. A protector according to claim 1 wherein said sheet is fashioned of a material substantially immune to chipping and cracking due to the impact of road gravel upon said sheet when the vehicle is driven at normal driving speeds.

5. A protector according to claim 1 wherein said maintaining means includes a dual sided adhesive tape extending substantially around the periphery of said sheet and substantially contacting the windshield substantially throughout the entire peripheral length thereof.

6. A protector according to claim 5 wherein said sheet includes a beading around substantially the entire peripheral edge of said sheet and wherein said tape is disposed substantially immediately adjacent to and peripherally inward of said beading substantially throughout the entire peripheral length thereof.

7. A protector according to claim 1 wherein said preventing means comprises a silicone rubber seal substantially surrounding substantially the entire peripheral edge of said sheet and substantially contacting the windshield substantially throughout the entire peripheral length thereof.

8. A method of selectively protecting a windshield of a vehicle from becoming chipped or cracked due to the impact of road gravel therewith during normal driving speeds comprising the steps of:
    providing a substantially transparent sheet substantially conforming to the configuration of the windshield;
    placing said sheet in an overlapping relationship with the windshield;
    applying a sealant around substantially the entire peripheral edge of said sheet and substantially in-contact with both said sheet and the windshield;
    driving the vehicle;
    displacing said sealant from contact with the windshield; and
    removing said sheet from said overlapping relationship.

9. A method of selectively protecting a windshield of a vehicle according to claim 8 wherein said sheet is placed in an overlapping, substantially spaced apart relationship with the windshield.

10. A method of selectively protecting a windshield of a vehicle according to claim 9 wherein said space is substantially in the range of one-sixteenth to three-sixteenths inch.

11. A protector adapted to substantially cover and protect a windshield of a vehicle, said protector comprising:
    a substantially transparent sheet substantially conforming to the configuration of the windshield;
    a beading disposed around substantially the entire peripheral edge of said sheet; and
    a dual sided adhesive tape adapted to contact the windshield and said sheet for selectively maintaining said sheet in an overlapping relationship with the windshield, said tape disposed substantially immediately adjacent to and peripherally inward of said beading substantially throughout the entire peripheral length thereof.

12. A protector according to claim 11 further comprising means for maintaining said sheet in a substantially spaced apart relationship with the windshield.

13. A protector according to claim 12 wherein said space is substantially in the range of one-sixteenth to three-sixteenths inch.

14. A protector according to claim 11 wherein said sheet is flexible and wherein the contour of said sheet conforms to the contour of the windshield.

15. A protector according to claim 11 wherein said sheet is fashioned of a material substantially immune to chipping and cracking due to the impact of road gravel upon said sheet when the vehicle is driven at normal driving speeds.

16. A protector according to claim 11 further comprising means for substantially preventing water from entering the region between said sheet and the windshield.

17. A protector according to claim 16 wherein said preventing means comprises a silicone rubber seal substantially surrounding substantially the entire peripheral edge of said sheet and substantially contacting the windshield substantially throughout the entire peripheral length thereof.

18. A protector adapted to substantially cover and protect the outside surface of a windshield of a vehicle when the vehicle is driven, the vehicle possessing at least one windshield wiper, and the protector further adapted to provide a surface upon which the windshield wiper can act, said protector comprising:
a substantially transparent sheet substantially conforming to the configuration of the windshield, said sheet being flexible and wherein the contour of said sheet substantially conforms to the contour of the windshield, said sheet providing a surface upon which the vehicle's windshield wiper can act; and
means for selectively maintaining said sheet in an overlapping relationship with the windshield both when the vehicle is parked and when the vehicle is driven.

19. A protector according to claim 18 further comprising means for maintaining said sheet in a substantially spaced apart relationship with the windshield.

20. A protector according to claim 19 wherein said space is substantially in the range of one-sixteenth to three-sixteenths inch.

21. A protector according to claim 18 wherein said sheet is fashioned of material substantially immune to chipping and cracking due to the impact of road gravel upon said sheet when the vehicle is driven at normal driving speeds.

22. A protector according to claim 18 wherein said maintaining means includes a dual sided adhesive tape extending substantially around the periphery of said sheet and substantially contacting the windshield substantially throughout the entire peripheral length thereof.

23. A protector according to claim 22 wherein said sheet includes a beading around substantially the entire peripheral edge of said sheet and wherein said tape is disposed substantially immediately adjacent to and peripherally inward of said beading substantially throughout the entire peripheral length thereof.

24. A protector according to claim 18 further comprising means for substantially preventing water from entering the region between said sheet and the windshield.

25. A protector according to claim 24 wherein said preventing means comprises a silicone rubber seal substantially surrounding substantially the entire peripheral edge of said sheet and substantially contacting the windshield substantially throughout the entire peripheral length thereof.

26. A protector according to claim 23 further comprising means for substantially preventing water from entering the region between said sheet and the windshield.

27. A protector according to claim 26 wherein said preventing means comprises a silicone rubber seal substantially surrounding substantially the entire peripheral edge of said sheet and substantially contacting the windshield substantially throughout the entire peripheral length thereof.

* * * * *